US008332922B2

(12) United States Patent
Dickinson et al.

(10) Patent No.: US 8,332,922 B2
(45) Date of Patent: Dec. 11, 2012

(54) TRANSFERABLE RESTRICTED SECURITY TOKENS

(75) Inventors: Richard L. Dickinson, Seattle, WA (US); Edward A. Martinez, Bellevue, WA (US); Dominic J. Pouzin, Sammamish, WA (US); Jasjit S. Grewal, Sammamish, WA (US); Michael J. Ott, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 11/848,464

(22) Filed: Aug. 31, 2007

(65) Prior Publication Data
US 2009/0064303 A1    Mar. 5, 2009

(51) Int. Cl.
*G06F 7/04*    (2006.01)
(52) U.S. Cl. .......... 726/10; 709/206; 709/209; 709/228; 713/157; 713/171; 380/280
(58) Field of Classification Search .................... 726/10; 709/228, 209, 206; 713/157, 171, 201; 345/744; 380/280
See application file for complete search history.

(56) References Cited

U.S. PATENT DOCUMENTS

| | | | |
|---|---|---|---|
| 6,263,436 B1 | 7/2001 | Franklin et al. | |
| 6,279,111 B1* | 8/2001 | Jensenworth et al. | 726/10 |
| 6,308,274 B1 | 10/2001 | Swift | |
| 6,718,328 B1 | 4/2004 | Norris | |
| 7,103,663 B2 | 9/2006 | Inoue et al. | 709/225 |
| 2002/0120697 A1* | 8/2002 | Generous et al. | 709/206 |
| 2003/0065789 A1* | 4/2003 | Meghashyam et al. | 709/228 |
| 2003/0107591 A1* | 6/2003 | Jameson | 345/744 |
| 2003/0163693 A1 | 8/2003 | Medvinsky | 713/169 |
| 2004/0073621 A1* | 4/2004 | Sampson | 709/209 |
| 2004/0088543 A1* | 5/2004 | Garg et al. | 713/157 |
| 2004/0093515 A1* | 5/2004 | Reeves, Jr. | 713/201 |
| 2004/0196981 A1* | 10/2004 | Nakano et al. | 380/280 |
| 2005/0188212 A1 | 8/2005 | Laferriere et al. | |
| 2005/0210448 A1 | 9/2005 | Kipman et al. | |
| 2005/0283444 A1 | 12/2005 | Ekberg | |
| 2006/0136361 A1 | 6/2006 | Peri et al. | |
| 2006/0136479 A1 | 6/2006 | Fan et al. | |
| 2006/0206932 A1 | 9/2006 | Chong | |

(Continued)

FOREIGN PATENT DOCUMENTS

JP    2003-330896    11/2003
(Continued)

OTHER PUBLICATIONS

Rubin (2002). Java security, Part 2: Authentication and authorization. Retrieved from http://www.ibm.com/developerworks/java/tutorials/j-sec2/section4.html.*

(Continued)

*Primary Examiner* — Jeffrey D Popham
*Assistant Examiner* — Brian Shaw
(74) *Attorney, Agent, or Firm* — Merchant & Gould (57) ABSTRACT

In a web-based service environment, third party providers need to have varying degrees of access to user data for their complementary services. To prevent third party providers from having broader access than necessary or not adequate levels of access, transferable restricted security tickets are employed to determine an appropriate level of access for third parties. Tickets with expiration and restriction roles define a duration and level of access for a third party. The restrictions are determined through an intersection of the authorizing user's security role and restriction roles defined in the system.

15 Claims, 9 Drawing Sheets

U.S. PATENT DOCUMENTS

2006/0248339 A1  11/2006  Kim et al.
2010/0106972 A1* 4/2010  Melen et al. .................. 713/171

FOREIGN PATENT DOCUMENTS

JP          15330896 A    11/2003

OTHER PUBLICATIONS

Weber. H. A. (Oct. 8, 2003). Role-based access control: The NIST solution. Sans Institute. Retrieved Feb. 7, 2012 from http://www.sans.org/reading_room/whitepapers/sysadmin/role-based-access-control-nist-solution_1270.*

Franklin, M. (1997). Fair Exchange with a Semi-trusted third party. ACM retrieved from http://www.cs.unc.edu/~reiter/papers/1997/CCS1.pdf.*

Lebanidze, E. (2004) Securing enterprise web applications at the source: an application security perspective. OWASP Tech. Report. retrieved from https://www.owasp.org/images/8/83/Securing_Enterprise_Web_Applications_at_the_Source.pdf.*

Rubin, B. (2002). Java security, part 2: Authentication and authorization. IBM developerworks.*

Weber, H. (2003). Role-based access control: The NIST solution. Sans Institute.*

PCT Search Report dated Mar. 11, 2009 cited in International Application No. PCT/US2008/073411.

Fair Exchange with a Semi-Trusted Third Party; http://delivery.acm.org/10.1145/270000/266424/p1-franklin.pdf?key1=266424&key2=2755013811&coll=GUIDE&dl=GUIDE&CFID=22598895&CFTOKEN=95266116.

2Securing Enterprise Web Applications at the Source: An Application Security Perspective http://www.owasp.org/images/8/83/Securing_Enterprise_Web_Applications_at_the_Source.pdf.

* cited by examiner

PRIOR ART

TRANSFERABLE RESTRICTED SECURITY TOKENS

BACKGROUND

Web-based services include interactions between a service provider, its users, and third parties that may provide complementary services such as integrated content from for providing specific services. Such integrated content may take the form of embedded frames, forms, or scripts. For example, a business records service may execute a variety of processes for its users based on the users' business contacts (e.g. historic data gathering, statistical analysis, scheduling of events, and the like). On the other hand, user and/or service provider designated third parties may execute sub-processes that complement the provided service such as providing a map for a business contact based on the address on record.

Customer Relationship Management (CRM) solutions are an example of a web-based business service that provide tools and capabilities needed to create and maintain a clear picture of customers, from first contact through purchase and post-sales, typically in a hosted computer application environment. For complex organizations, a CRM system may provide features and capabilities to help improve the way sales and marketing organizations target new customers, manage marketing campaigns, and drive sales activities. CRM systems may include many components, hardware and software, utilized individually or in a shared manner by users internal or external to the organization as well as third party providers.

To execute the sub-process, the third party typically needs to have access to the user's records at the service provider. In the above example, the third party would need to access the business contact's address in order to generate a map and integrate it into the service provider's webpage(s). Giving access to user data for reading, modifying, creating, and deleting the data may present security challenges especially when the third party providers are not a trusted entity.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing enhanced security of user records at a web-based service provider by controlling access of third party providers to user data with transferable restricted security tokens. A transferable restricted security token is generated in form of a ticket with security restrictions in addition to those assigned to the user and a ticket expiration.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, user data security in a web-based service may be enhanced by using restricted security tickets for allowing access to the data by third party providers. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
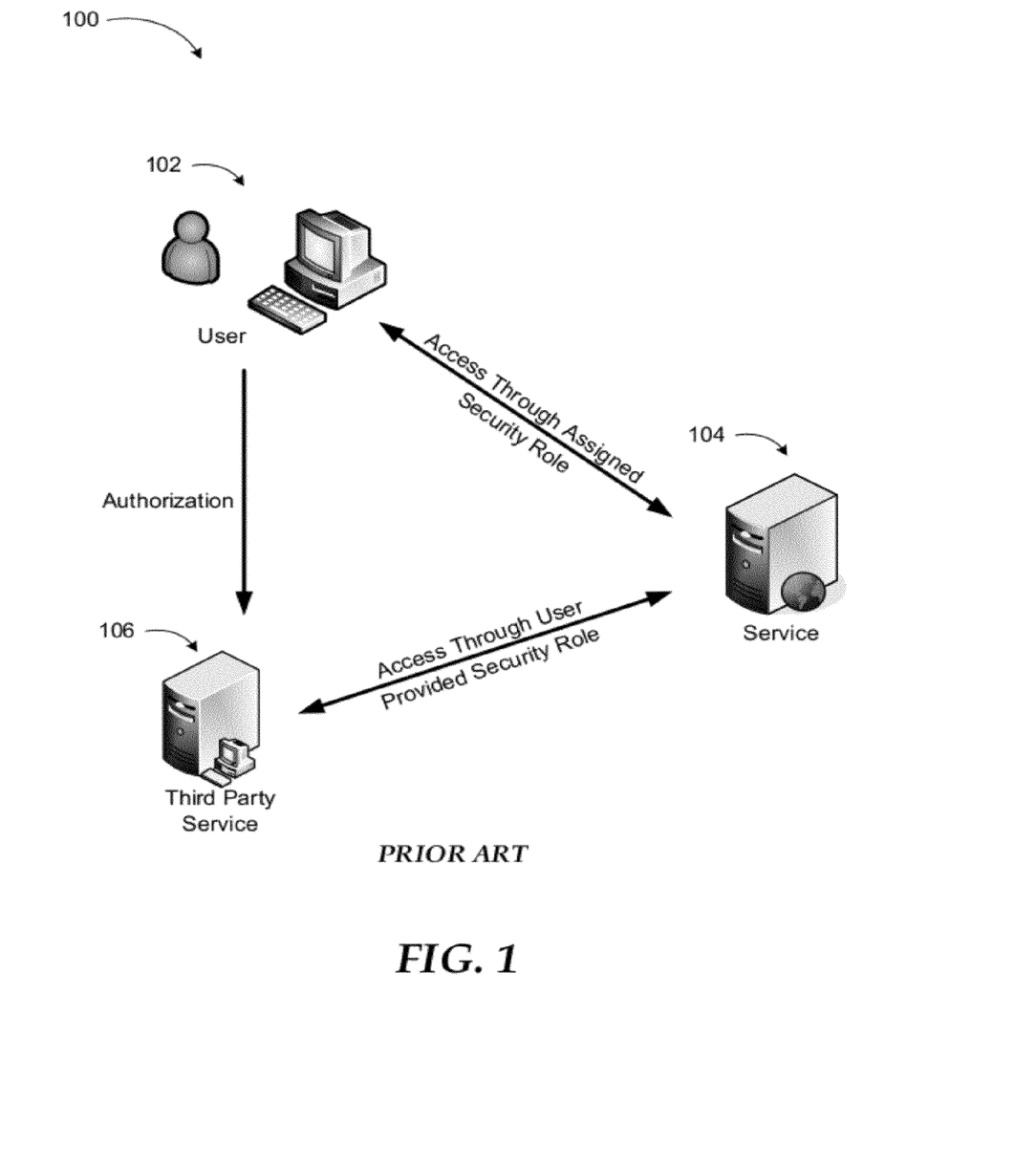
FIG. 1 is a diagram illustrating typical data access interactions between a user, a service provider, and a third party provider of a web-based service.

Referring to FIG. 1, a diagram of typical data access interactions between a user, a service provider, and a third party provider of a web-based service is illustrated.

As mentioned before, third party providers may execute sub-processes within a web-service complementing processes of the service for its users. One example, described previously, is a third party providing a map of a contact for a web-based service that processes contacts for users. Another example is a third party service for computing credit scores within a CRM system. The CRM contact form may be customized to execute a script which calls into the third party, passing a contact identifier. The third party may then call back into the CRM service to retrieve various contact and order information, so as to compute a credit score for the selected contact. The third party may return a credit rating score which may be displayed in a field of the contact form. The third party may also directly update the contact record with other useful statistics.

Thus, third party providers may need to have access to user data within the web-based system for collect, modify, delete, or create operations. The challenges in accommodating such third party operations include how to control which third parties are to be allowed for these operations, at which level of permission, for what duration, and so on.

In a conventional web-based service environment, as shown in diagram 100 of FIG. 1, each user 102 may have an assigned security role within the web-based service 104 and access the service as allowed by that role. User 102 may, at some point, authorize third party service 106 to perform operations by providing its security ticket to the third party service 106, for example. In that case, third party service 106 would have full access to all the data associated with user 102 as allowed by that user's security role and perform its operations. The disadvantage of such a set-up is that users may not want the third party to have the full access capabilities to all of their data that the user himself/herself has.

To complicate the matter further, an organization may have a number of internal users with varying security roles. If one of them is to authorize the third party, that user's security role may not be adequate to perform the needed operations or on the contrary it may be broader than desired. For example, a receptionist at a company may have limited access such as "read" only to business contact information. If that receptionist tries to activate a third party service for computing credit scores, the third party may not be able to update the data at the web-service because of the limited security role of the receptionist.

On the other hand, a high level manager with broad access privileges may wish to activate a map service for a business contact, which would typically require limited access privileges for the third party. However, because the manager has broad access privileges, the third party would get the same privileges through the manager's security ticket whether needed or not.

Another approach to control third party access to user data may be assigning third party service providers limited security roles at the web-service, but that may severely restrict the flexibility of the web-based service to allow users to use a third party service of their choice making customization of user services a very challenging task.

Figure 2:
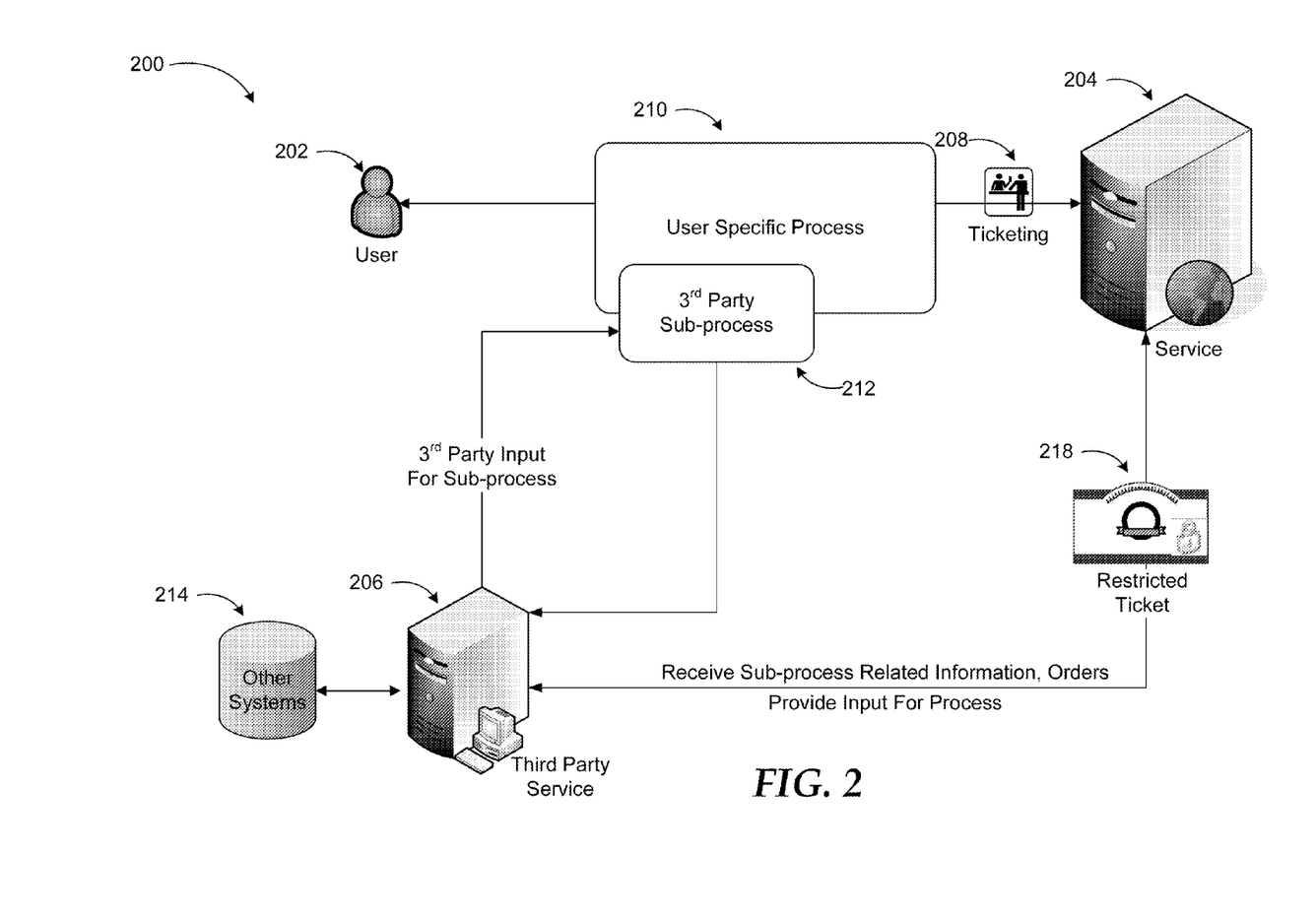
FIG. 2 illustrates example interactions between the user, the service provider, and the third party provider of a web-based service according to embodiments.

FIG. 2 illustrates example interactions between the user, the service provider, and the third party provider of a web-based service according to embodiments.

As discussed above, the challenge for web-based service providers is how to control which third parties are allowed to call back into service, with which level of permission, and for which exact duration. For example, if a service administrator is viewing a contact form in a CRM service, transferring a connecting user's entire security context to the semi-trusted third-party could mean the third party can now access records beyond what it really needs to perform the intended service. An administrator may be authorized to delete any type of record, create any type of record, or make schema changes (ex: create new entities, attributes, etc.). Transferring the connecting user's entire security context to a semi-trusted third-party expected to only provide a narrow set of specific services may result in serious risks.

According to an embodiment, a ticket may be generated for a third party provider. The ticket may specify additional security restrictions and a ticket expiration. Additional security restrictions may be defined using the web-based service role infrastructure. Specific domain names of the third party providers may then be associated with restriction roles. For example, a restriction role may be defined for third-party domain "http://accuratecreditinfo.com" to grant: [activity read permission with a scope of local]+[lead create and read permission, with a scope of current business unit]. However, in case the connecting user does not have permissions to create leads, security may be evaluated by intersecting permissions for the connecting user (and its roles) with permissions defined by the restriction role to ensure there is no elevation. The restriction role may also specify a scope of a current business unit.

In diagram 200, web-based service is represented by server 204, which executes user specific process(es) 210 for user 202. A ticket verification process (208) may be employed to authenticate the user and determine its access privileges. The authentication information may be included in the ticket. In a service according to embodiments, third party service 206 may execute sub-process 212 to complement the user specific process 210. To access the user data and orders at the web-based service, third party service 206 may provide restricted security ticket 218 to the web-based service 204. Third party service 206 may also interact with other systems 214.

Restricted security ticket 218 may also be authenticated by the web-based service. The authentication may be performed through a number of ways. One such method is Hash Message Authentication Code (HMAC). A "MAC tag" is generated based on a secret key included in the message (ticket in this case), such that it is difficult for an attacker to generate a valid pair (message, tag).

Instead of HMACs, digital signatures may also be used according to other embodiments. With digital signatures, components can verify claims, but may not have the ability to generate valid tickets (only a verification key may be available to them). With HMACs, components can verify claims, but then also have the ability to create valid tickets since they have access to the required symmetric key. Using digital signatures may be useful to allow further delegation. For example, third parties may transfer web-based service tickets to other third parties, which can verify access to the web-based service before taking certain actions. Other authentication methods may also be employed using the principles described herein.

Thus, an example ticket be in following form: {UserId+Expiration+RestrictionRoleIds+HMAC(UserId+Expiration+RestrictionRoleIds)}. The ticket may also include a key indicator (to know which key to use, if rotating keys are used that each expire after some time) and an organization Id (to prevent cross-organization attacks where the same UserId may be reused).

According to another embodiment, web-based service administrators may be enabled to specify that tickets should be restricted to particular actions such as read only actions.

This may be accomplished, for example, by adding a bit to the HMAC of the ticket, then blocking write actions in the platform.

According to a further embodiment, a restricted user/domain may be created in the system instead of including the list of restricted roles in the ticket. A restricted user/domain may have roles associated to them and these roles may be used as the restricted roles. The intersection of user roles and the restricted roles may be determined as described above. In this scenario, the ticket may be in the form: {UserId+Expiration+ RestrictedUserId+HMAC(UserId+Expiration+RestrictedUserId)}.

In the version where the restricted ticket contains the role list, the roles associated to the domain may have changed, but the security restrictions are based on the set of roles in the ticket, although the privileges in the role may be changed independently. In the restricted user/domain approach, the server maintains control of the restricted roles. Thus, the roles in the version with just a restricted domain/user can be added/ changed/removed independently of tickets that have already been granted.

While a privilege intersection may be performed when the ticket comes back from the web service (e.g. CRM service) according to one embodiment with the advantages of dynamically re-evaluating potentially changed user privileges and not processing a ticket that is never used by a third party (saving system resources), the same intersection may also be performed when the ticket is first issued using the principles described herein.

Figure 3:
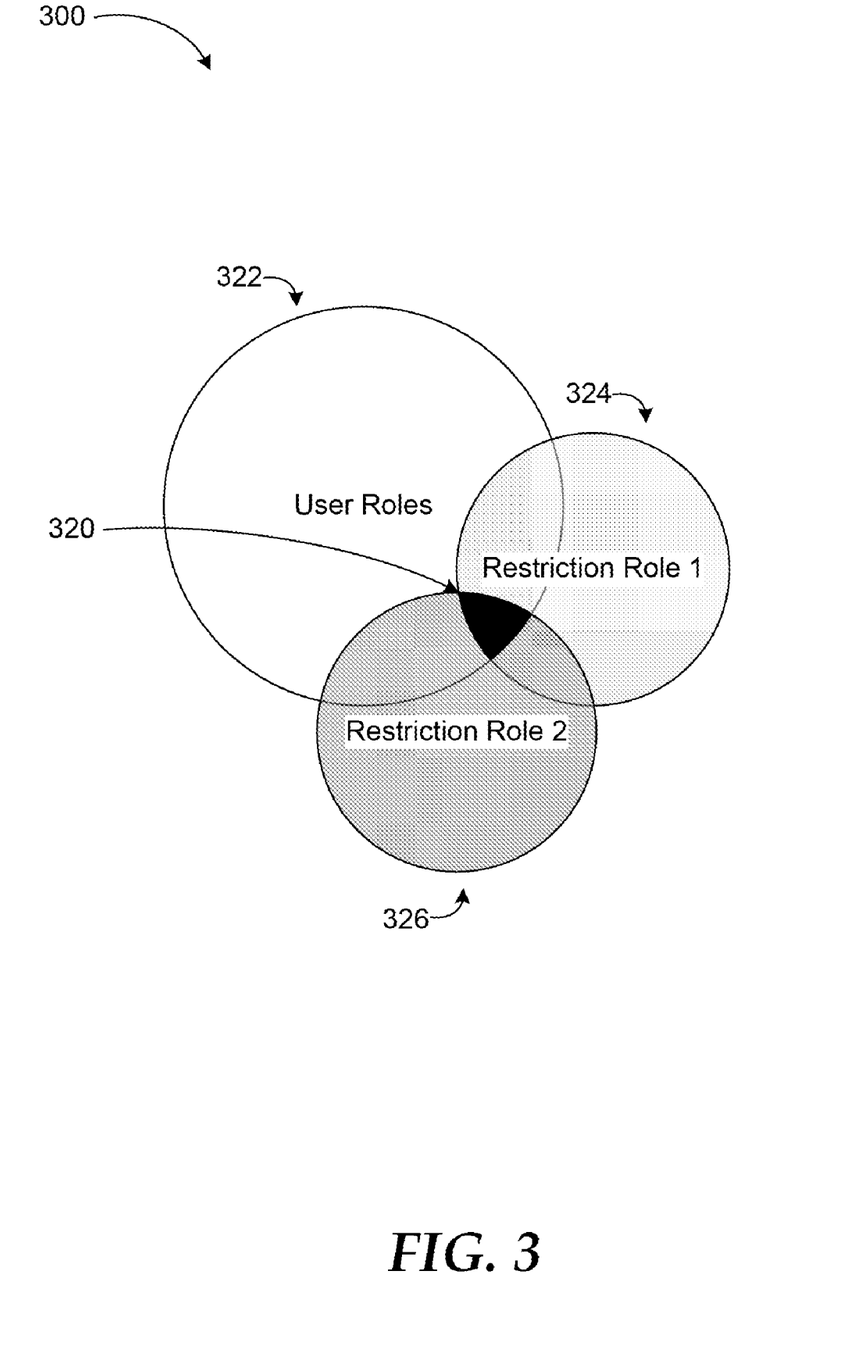
FIG. 3 is a conceptual diagram illustrating the use of user and restriction roles in determining security restrictions to be assigned to a third party provider of a web-based service.

FIG. 3 is a conceptual diagram illustrating the use of user and restriction roles in determining security restrictions to be assigned to a third party provider of a web-based service.

In a role-based access privilege system, privilege depths may be defined at various levels based on the user's relationship to the records. For example, a "basic" depth may defined for records owned by the user; a "local" depth may be defined for records of the business unit the user belongs to; a "deep" depth may be defined for records of the user's business unit or any child business units; and a "global" depth may be defined for records in any business unit of the umbrella organization.

Based on these example privilege depths, a user may be assigned a single role defined as: "Read Activity" with depth of basic; "Write Lead" with depth of deep; and "Create Contact" with depth of deep. A third party provider may be assigned a single role defined as: "Write Lead" with depth of local and "Create Contact" with depth of global.

In a service according to embodiments, the intersection 320 of these roles (e.g. user roles 322 with restriction role 324 and restriction role 326) would result in a "Write Lead" role with a depth of local and a "Create Contact" role with depth of deep (the smaller of the depths is chosen in each case).

The restriction roles, privilege depths, and the intersection scenarios above are provided for illustration purposes only and do not constitute a limitation on embodiments. Embodiments may be implemented using any defined privilege depth, organizational structure, and restriction roles. Furthermore, additional rules may be defined for determining the intersection of the user roles and restriction roles beyond the smaller of the two restrictions. Moreover, a CRM service is used herein as an example web-based service. Embodiments may be implemented with any application security restrictions using the principles described herein.

Figure 4:
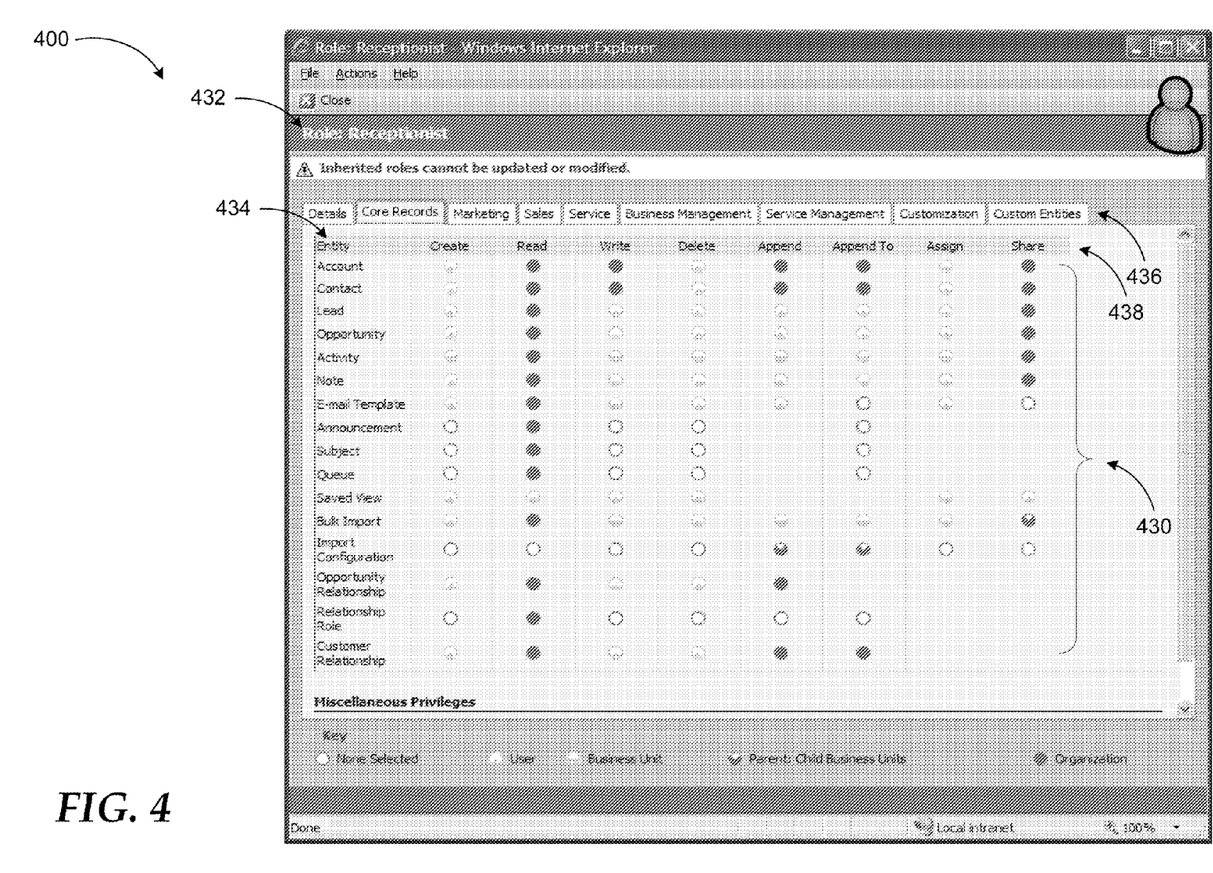
FIG. 4 is a screenshot of a software program for assigning access restrictions to users of a web-based service.

FIG. 4 is a screenshot (400) of a software program for assigning access restrictions to users of a web-based service.

As discussed above, security roles may be assigned to each user of an organization with varying access permission levels. For example, the access management module of the web-service program may allow an administrator to define a security role for each user as shown in the screenshot. The example role is being created for receptionist (432). Different types of records such as account, contact, email template, etc. are listed in a column (434). Access operations (438) such as create, read, write, delete, and so on, are listed in corresponding columns enabling the administrator to set the permission level for each operation on each type of record in a matrix (430).

The user interface may be set up such that records are grouped for organizational sub-divisions as shown by the tabs (436). The security roles may be assigned by the user and transmitted to the web-based service, modified by the user on a template of default roles generated by the web-based service, or assigned by the user in a configuration mode of the web-based service's management program.

Figure 5:
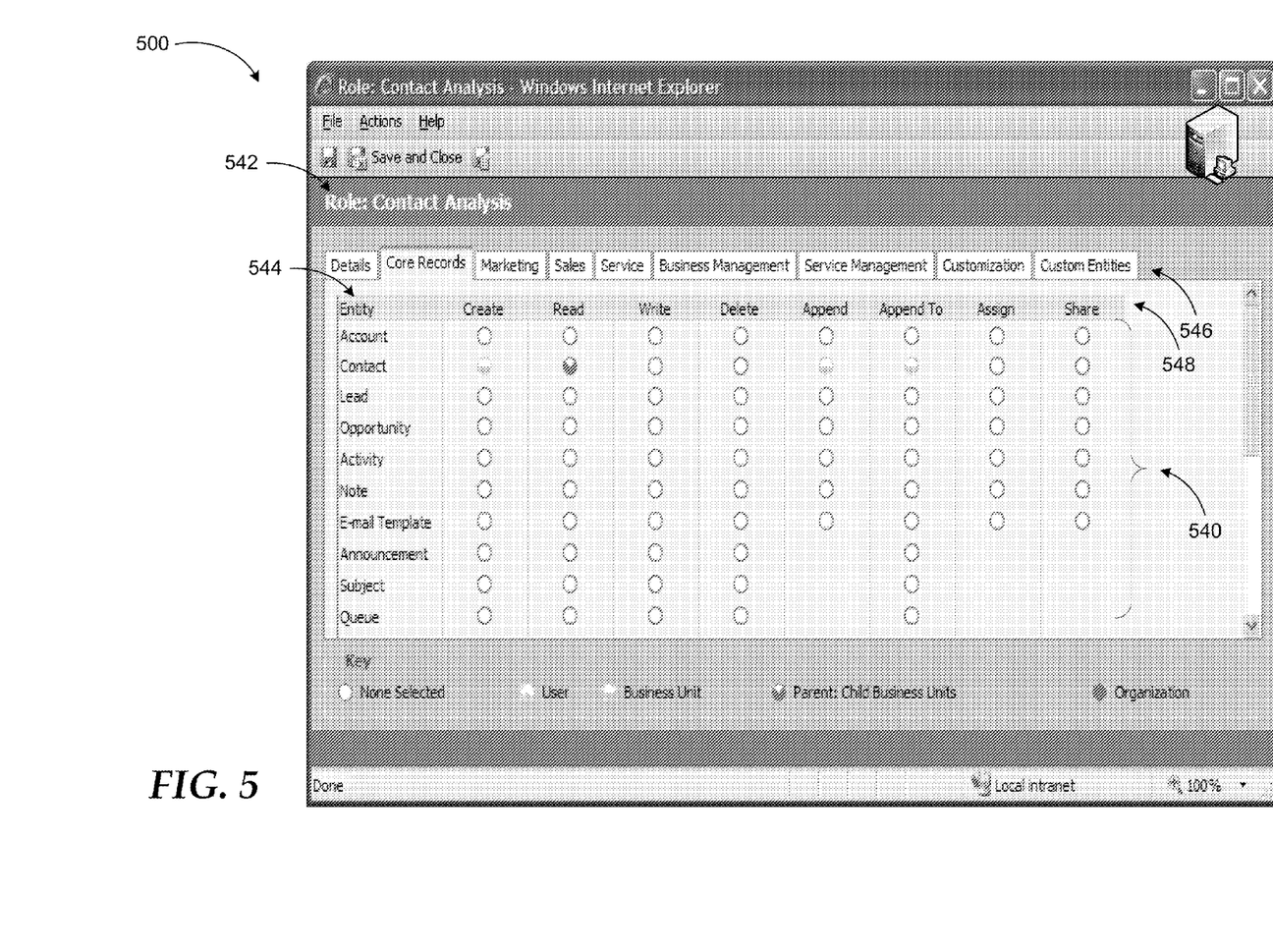
FIG. 5 is a screenshot of a software program for assigning access restrictions to third party providers of a web-based service.

FIG. 5 is a screenshot of a software program for assigning access restrictions to third party providers of a web-based service. Third party providers may perform a variety of tasks complementing the web-based service. The example process illustrated in screenshot 500 is contact analysis.

The configuration user interface in screenshot 500 is similar to that of FIG. 4 with the record types (544) listed as the first column in a matrix and the access types listed as the first row (548). Restrictions of access for each record type and access type are shown as elements of the user interface matrix 540. A user interface according to embodiments includes, importantly, controls for enabling partner access restrictions, a partner being defined by a URL associated with the third party provider.

Furthermore, restrictions may also be determined based on an organizations hierarchical structure. For example, restriction roles may be defined based on whether the third party service is being performed for an individual user, a business unit, a business sub-unit, or the entire organization.

Figure 6:
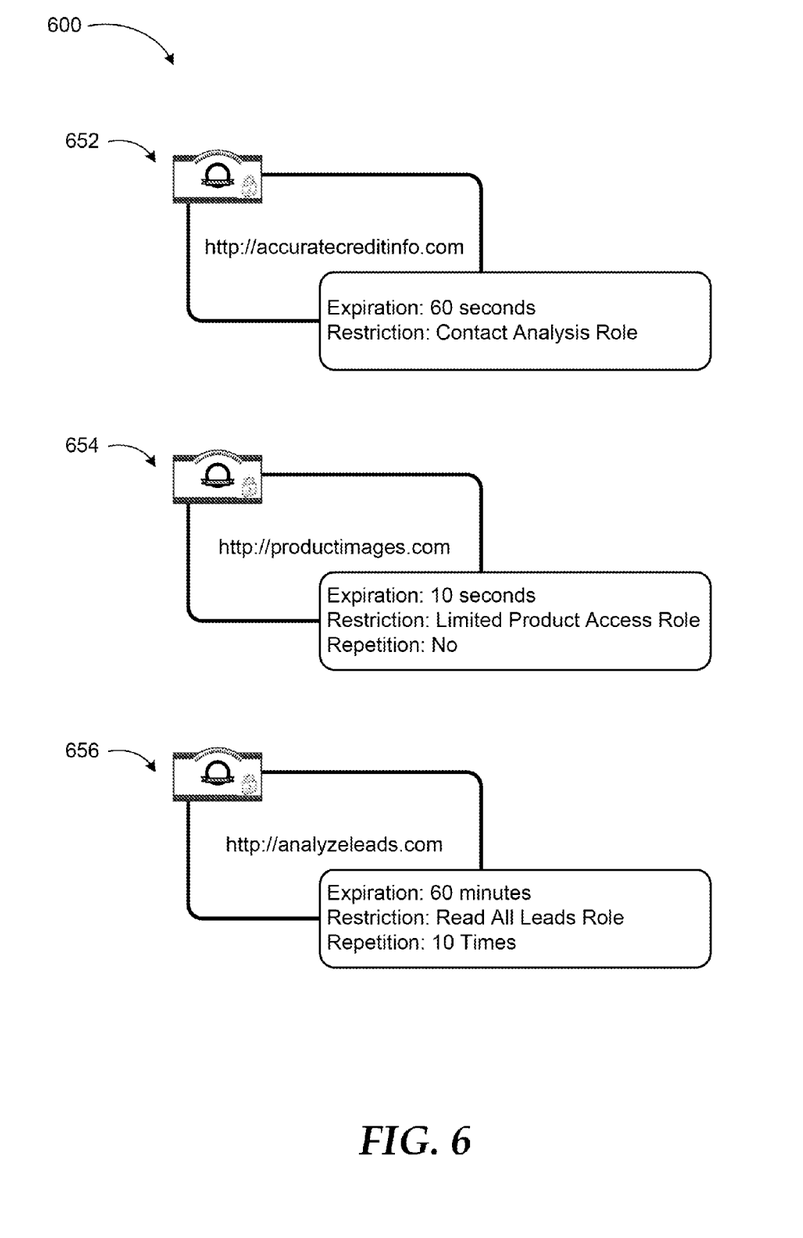
FIG. 6 illustrates three example restricted security tickets according to embodiments.

FIG. 6 illustrates three example restricted security tickets according to embodiments. Restricted security tickets according to embodiments may include elements in addition to those illustrated in the figure. Expiration and restrictions are also not limited to the shown examples.

As mentioned previously, role restrictions for third parties may be associated with specific domain names in a web-based service. The first example ticket 652 is associated with the domain name http://accturatecreditinfo.com (a fictional domain name). The ticket has an expiration of 60 seconds and a restriction of contact analysis role only. Thus, the third party assigned with ticket 652 has 60 seconds to perform its process once the ticket is accepted and it can only access the user data at the web-based service for performing contact analysis.

The second ticket 654 is associated with the domain name http://productimages.com, which may be a third party provider service for processing product images of a particular business. The ticket has an expiration period of 10 seconds and the restriction is limited product access role. This role may be defined in an access management portion of the web-based service. In addition to the expiration and the restriction, ticket 654 may optionally include a repetition parameter. The repetition parameter may enable third party providers to use their security ticket repeatedly based on a value of the repetition parameter. In the example of FIG. 6, the repetition parameter is set to "No" meaning the ticket is a single use ticket.

Example ticket 656 is associated with domain name http:// analyzeleads.com, which may provide analysis of business leads for a CRM service. The expiration of the ticket is set to 60 minutes with the restriction being "read all leads". Thus, the third party with this ticket may read all business lead data in the CRM service, but not perform any additional access operations. The optional repetition parameter is set to 10 times in this case meaning the third party provider may use the same ticket up to ten times to access the user data.

According to some embodiments, the time stamp expiration may be implemented in other ways such as instead of a period of expiration defining a range of valid time period (date and time). Furthermore, more complex expressions may be included in the ticket to express relatively more flexible restrictions. For example, an expression like &(time.hour<8) (user.startswith("a*"))(user.role.includes(CEO)) may be used to provide time expiration, a user id (or name) category, as well as user role.

According to one embodiment, third parties may be provided with the ability to further restrict the ticket before handing it off to another third party. Thus, if one third party needs to use some services from another third party, they may choose to create a further restricted token (or the service may do so) such that the ticket includes multiple restricted user IDs, or restricted role IDs originating from more than one domain.

The example systems, services, tickets, and operations described in FIGS. 2, 4, 5, and 6 are exemplary for illustration purposes. A system providing transferable restricted security tickets in a web-based service environment may be implemented using additional or fewer components and elements using the principles described herein.

Figure 7:
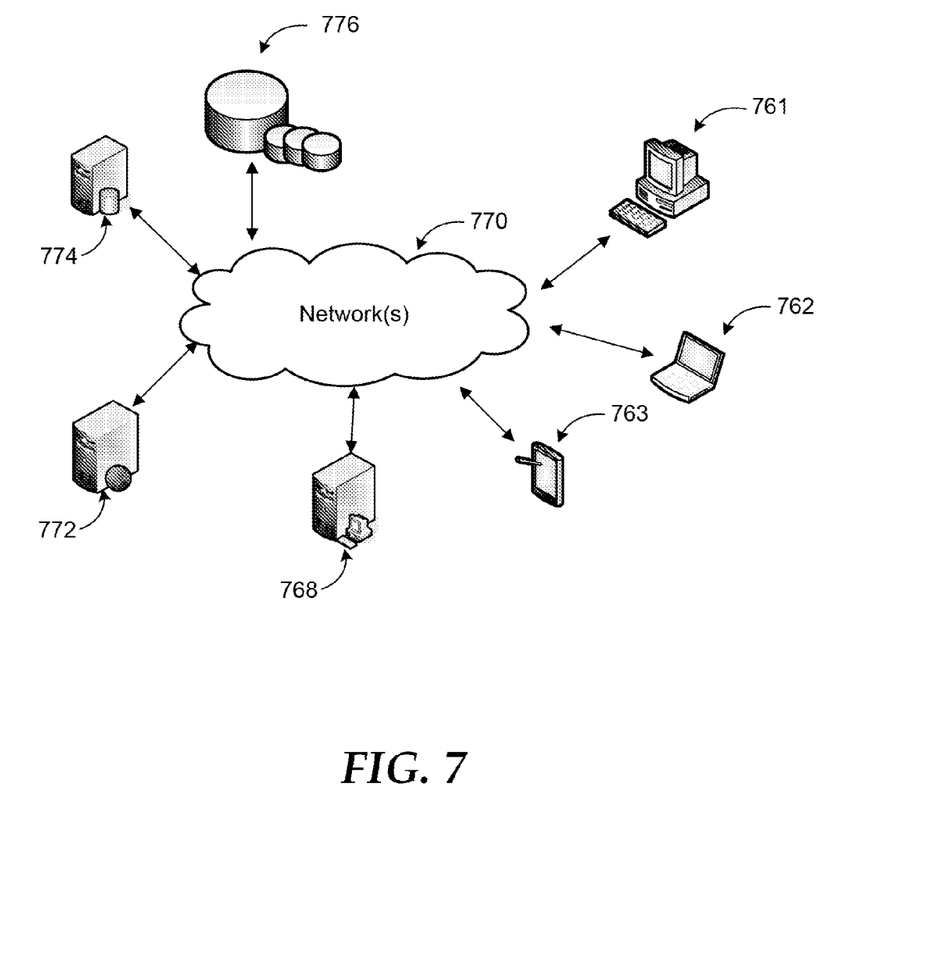
FIG. 7 is a diagram of an example networked environment, where embodiments may be implemented.

FIG. 7 is an example networked environment, where embodiments may be implemented. A web-based service that provides restricted security tokens for third party providers may be implemented in a distributed manner over a number of physical and virtual clients and servers. The service may also be implemented in un-clustered systems or clustered systems employing a number of nodes communicating over one or more networks (e.g. network(s) 770).

Such a system may comprise any topology of servers, clients, Internet service providers, and communication media. Also, the system may have a static or dynamic topology. The term "client" may refer to a client application or a client device. While a networked system implementing transferable restricted security tickets may involve many more components, relevant ones are discussed in conjunction with this figure.

Users may access a web-based service using individual client devices 761-763. The web-based service may be managed by one or more servers such as web server 772. Data for a variety of purposes associated with the web-based service may be stored in data stores 776, which may be accessed directly or managed by database server 774. A third party service complementing the services provided by web-server 772 (and associated servers) may access the web-based service using a transferable restricted security ticket as described previously and execute sub-processes that are integrated into the web-based service.

Network(s) 770 may include a secure network such as an enterprise network, an unsecure network such as a wireless open network, or the Internet. Network(s) 770 provide communication between the nodes described herein. By way of example, and not limitation, network(s) 770 may include wired media such as a wired network or direct-wired connection, and wireless media such as acoustic, RF, infrared and other wireless media.

Many other configurations of computing devices, applications, data sources, data distribution systems may be employed to implement transferable restricted security tickets in a web-based service environment. Furthermore, the networked environments discussed in FIG. 7 are for illustration purposes only. Embodiments are not limited to the example applications, modules, or processes.

Figure 8:
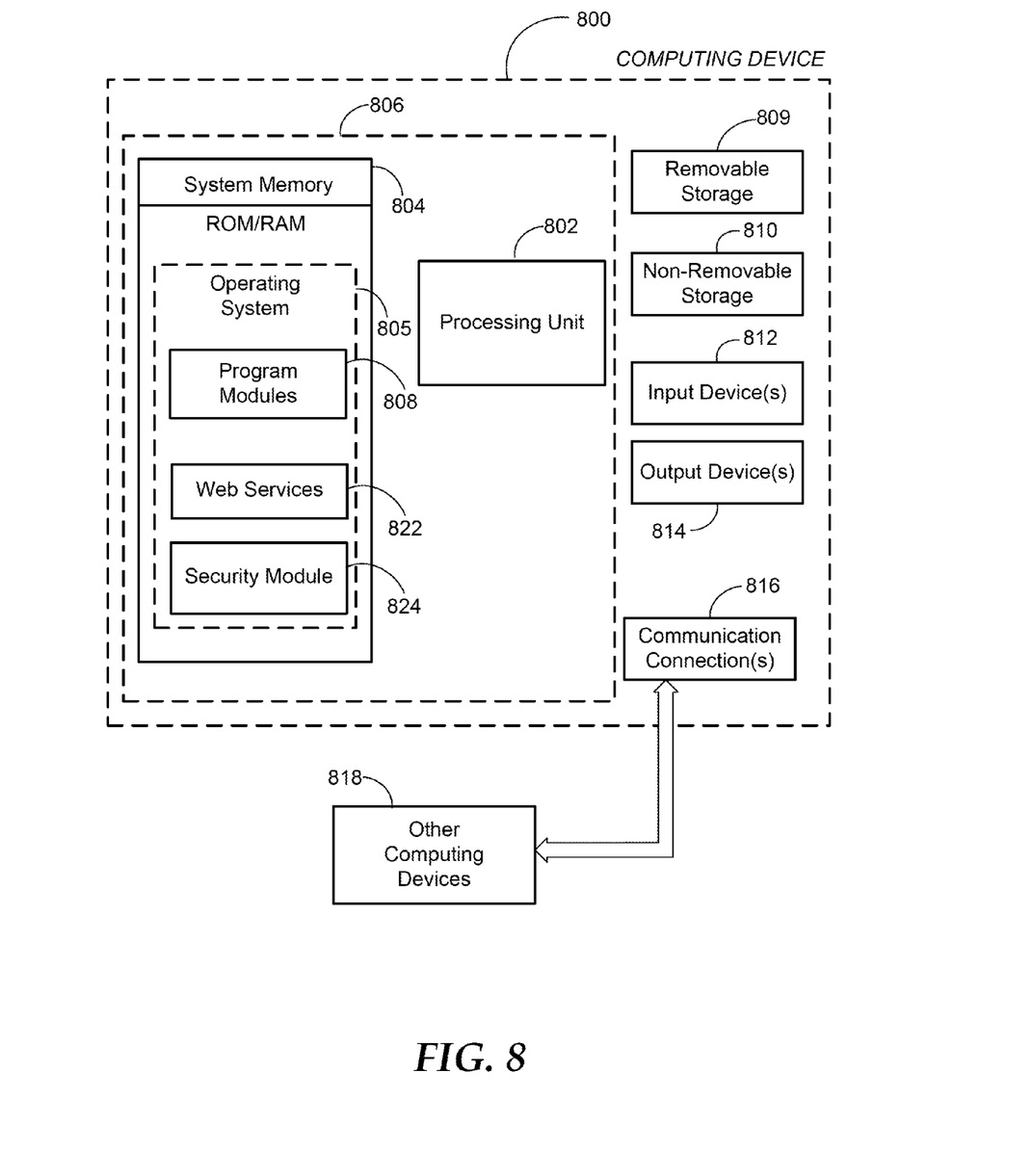
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment is illustrated, such as computing device 800. In a basic configuration, the computing device 800 may be a server providing services associated with web-based service that allows third party providers access data through restricted security tickets and typically include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of a networked personal computer, such as the WINDOWS® operating systems from MICROSOFT CORPORATION of Redmond, Wash. The system memory 804 may also include one or more software applications such as program modules 808, web services 822, and security module 824.

Web services 822 may be a separate application or an integral module of a hosted web-based service application that provides data and processing services to client applications associated with computing device 800. Security module 824 may provide services associated with ensuring secure access to data by user and/or third party providers implementing restricted security tickets, as described previously. This basic configuration is illustrated in FIG. 8 by those components within dashed line 806.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and non-volatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well known in the art and need not be discussed at length here.

The computing device 800 may also contain communication connections 816 that allow the device to communicate with other computing devices 818, such as over a wireless network in a distributed computing environment, for example, an intranet or the Internet. Other computing devices 818 may include server(s) that execute applications associated with the web-based service. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
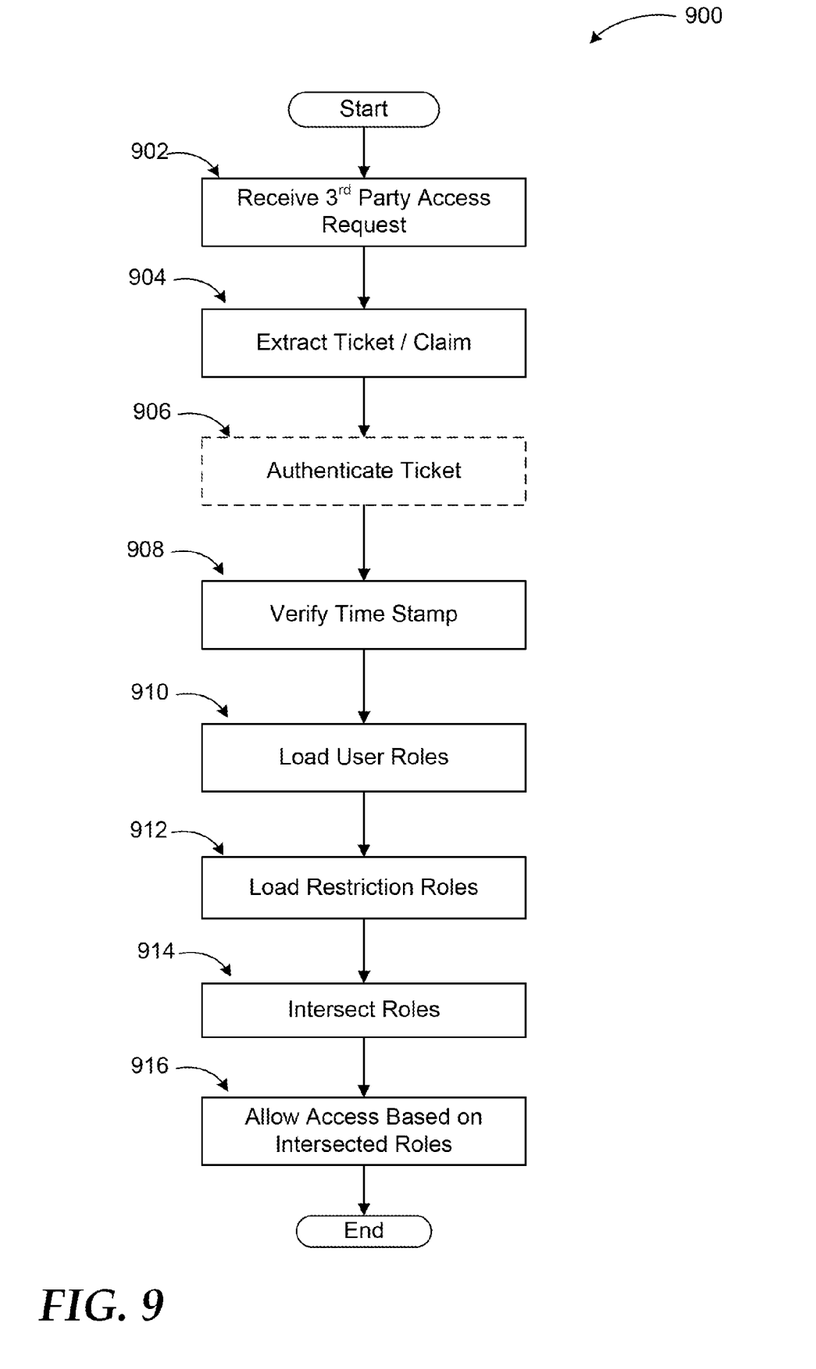
FIG. 9 illustrates a logic flow diagram for a process of using restricted security tickets for allowing access to user data by third party providers in a web-based service.

FIG. 9 illustrates a logic flow diagram for a process (900) of using restricted security tickets for allowing access to user data by third party providers in a web-based service. Process 900 may be implemented as part of a CRM service.

Process 900 begins with operation 902, where a request for access is received from a third party provider. As described previously, third party providers may execute sub-processes complementing the services provided by the web-based service. Processing advances from operation 902 to operation 904.

At operation 904, a security ticket and claim are extracted from the request. The claim defines a scope of requested access. The ticket includes an expiration and a restriction. The ticket may also include an optional repetition parameter that defines how many times the same ticket may be used. Processing moves from operation 904 to optional operation 906.

At optional operation 906, the ticket is authenticated. The ticket may be authenticated through a variety of mechanisms such as a trusted third party authentication, public/private key encryption, Hash Message Authentication Code (HMAC) encryption, and the like. After operation 906, processing moves to operation 908.

At operation 908, a time stamp of the ticket is verified. If the time stamp is invalid, the process may be halted and access denied to the third party requester. Processing moves from operation 908 to operation 910.

At operation 910, user roles are loaded by the security module. Processing advances from operation 910 to operation 912, where the restriction roles are also loaded by the security module.

At operation 914 following operation 912, the user roles and the restriction roles are intersected for determining the restrictions applicable to the requesting third party provider. Processing proceeds from operation 914 to operation 916.

At operation 916, access is granted to the requesting third party provider based on the restrictions determined from the intersection of the restriction roles and the user roles (and the expiration defined in the ticket). After operation 916, processing moves to a calling process for further actions.

The operations included in process 900 are for illustration purposes. Using transferable restricted security tickets for allowing access to third parties in a web-service may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for securely handling third party requests for access to user data in a web-based service environment, comprising:
receiving a request for access from a third party provider, wherein the request is associated with a sub-process complementing a process of the web-based service;
extracting a ticket and a claim from the request, wherein the ticket includes an expiration parameter, a restriction role and a key indicator, the restriction role defined to grant permissions specifying a local scope and a scope of a current business unit, the key indicator indicating which of a plurality of rotating keys for use in the ticket, each of the plurality of rotating keys expiring after a time period;
verifying that the ticket has not expired;
loading at least one user role associated with the ticket;
authenticating the ticket by employing a Hash Message Authentication Code (HMAC);
adding a bit to the HMAC of the ticket;
in response to adding the bit to the HMAC of the ticket, blocking write actions in a platform associated with the web-based service to restrict the ticket to read-only actions;
determining an access restriction for the request based on intersecting the restriction role and the at least one user role when a connecting user has at least one permission specifying the local scope while not having at least one permission specifying the scope of the current business unit to prevent an elevation of the restriction role for the connecting user, the restriction role being added, changed and removed independently of tickets that have already been granted; and
enabling the third party provider to access the user data based on the determined access restriction.

2. The method of claim 1, wherein the ticket is associated with a domain name of the third party provider.

3. The method of claim 1, wherein the ticket is authenticated employing a digital signature.

4. The method of claim 3, wherein the claim is verified using the digital signature.

5. The method of claim 1, wherein the ticket further includes an organization identifier, the organization identifier utilized to prevent at least one cross-organization attack in which a same user identification in the HMAC is reused.

6. The method of claim 1, wherein the ticket further includes a repetition parameter that defines how many times the ticket may be used to access the user data.

7. The method of claim 1, wherein intersecting the restriction role and the at least one user role includes selecting a stricter one of the restrictions defined in the roles.

8. The method of claim 1, further comprising:
applying a predefined rule in addition to selecting the stricter one of the restrictions defined in the roles.

9. A system for securely handling third party requests for access to user data in a web-based CRM service environment, comprising:
  at least one CRM web server configured to:
    receive a request for access from a third party provider, wherein the request is associated with a sub-process complementing a process of the web-based CRM service;
    extract a ticket from the request, wherein the ticket is associated with a domain name of the third party provider and includes an expiration parameter, and a restriction parameter and a key indicator, the key indicator indicating which of a plurality of rotating keys for use in the ticket, each of the plurality of rotating keys expiring after a time period;
    verify that the ticket has not expired;
    retrieve a list of restriction roles from the ticket, the restriction roles defined to grant permissions specifying a local scope and a scope of a current business unit;
    load a user role associated with the sub-process;
    authenticate the ticket by employing a Hash Message Authentication Code (HMAC);
    add a bit to the HMAC of the ticket;
    in response to adding the bit to the HMAC of the ticket, blocking write actions in a platform associated with the web-based service to restrict the ticket to read-only actions; and
    determine an access restriction for the request based on intersecting the restriction roles and the user role when a connecting user has at least one permission specifying the local scope while not having at least one permission specifying the scope of the current business unit, to prevent an elevation of the restriction roles for the connecting user, the restriction roles being added, changed and removed independently of tickets that have already been granted; and
    enable the third party provider to access the user data based on the determined access restriction.

10. The system of claim 9, wherein each restriction role and the user role are include a privilege depth defining an access permission level for the user data, and the access restriction is determined by selecting the stricter of the privilege depths of the intersected roles.

11. The system of claim 9, wherein the CRM web server is further configured to provide a Graphical User Interface (GUI) for configuring the privilege depths of the restriction roles and the user role.

12. The system of claim 9, wherein a restrictions assigned to a user role associated with the sub-process are defined based on a hierarchical structure of a client organization of the web-based CRM service.

13. A computer-readable storage device with instructions stored thereon which, when executed by a computing device, perform a method for securely handling third party requests for access to user data in a web-based service environment, the method comprising:
  receiving a request for access from a third party provider, wherein the request is associated with a sub-process complementing a process of the web-based service;
  extracting a ticket and a claim from the request, wherein the ticket is associated with a domain name of the third party provider and includes an expiration parameter, a restriction role, a Hash Message Authentication Code (HMAC), a repetition parameter, a key indicator and an organization identifier, the restriction role defined to grant permissions specifying a local scope and a scope of a current business unit, the key indicator indicating which of a plurality of rotating keys for use in the ticket, each of the plurality of rotating keys expiring after a time period, the organization identifier utilized to prevent at least one cross-organization attack in which a same user identification in the HMAC is reused;
  authenticating the ticket employing the (HMAC);
  adding a bit to the HMAC of the ticket;
  in response to adding the bit to the HMAC of the ticket, blocking write actions in a platform associate with the web-based service to restrict the ticket to read-only actions;
  verifying that the ticket has not expired;
  loading at least one user role associated with the ticket;
  determining an access restriction for the request based on intersecting the restriction role and the at least one user role when a connecting user has at least one permission specifying the local scope while not having at least one permission specifying the scope of the current business unit to prevent an elevation of the restriction role for the connecting use, the restriction role being added, changed and removed independently of tickets that have already been granted; and
  enabling the third party provider to access the user data based on the determined access restriction.

14. The computer-readable storage device of claim 13, wherein intersecting the restriction role and the at least one user role includes selecting a stricter one of the restrictions defined in the roles and applying a predefined rule.

15. The computer-readable storage device of claim 13, wherein the access includes at least one from a set of: creating a new record, deleting an existing record, modifying an existing record, updating an existing record, retrieving operational parameters associated with executing the sub-process, and modifying a schema associated with the user data.

* * * * *